Missing
Page

Do Susan

The [illegible] a patent
to not to print.

UNITED STATES PATENT OFFICE.

CORNELIA WATERMAN, OF BROOKLYN, NEW YORK, ADMINISTRATRIX OF STEPHEN WATERMAN, DECEASED, AND ASSIGNEE OF ISAAC D. RUSSELL.

IMPROVEMENT IN MACHINES FOR SAWING OFF LOGS.

Specification forming part of Letters Patent No. 3,092, dated May 19, 1843; Reissue No. 438, dated March 17, 1857.

*To all whom it may concern:*

Be it known that ISAAC D. RUSSELL, of the city, county, and State of New York, and STEPHEN WATERMAN, of Greenwich, county of Fairfield, and State of Connecticut, have invented a new and useful Machine for Sawing; and I do hereby declare the following to be a full, clear, and exact description thereof, reference being had to the annexed drawings, making part of this specification, in which—

Figure 1 is a view in perspective, and Fig. 2 is a section detached.

The nature of the invention consists in constructing an apparatus for holding a piece of timber up to a saw so as to saw it off any number of times, revolving the stick while sawing and only centering it once for the whole operation.

The frame consists of one sill-piece, *a*, supported on two cross-sills, *b*, near the center of which two uprights, *c*, are erected, standing a little distance apart and properly braced. At one end of the sill there is a short upright post, from which a horizontal beam, *a'*, extends, connecting it with the upright *c*. This beam serves to attach the upper bearing of an upright shaft to a circular saw, *d*, the lower bearing of which is affixed to the sill below.

From a projecting piece, *e*, on one of the uprights near the lower end, a shaft of iron, *f*, rises up to the top where it is supported by a staple. Near the upper end of this shaft it is surrounded by a collar with a set-screw in it. From the collar an arm, *g*, projects horizontally, for a purpose hereinafter described. Below this is a frame, *h*, consisting of two horizontal and two upright pieces, the former of which extend out beyond the frame, and on one side form collars which surround the shaft. On the other side they form bearings for the journals of an upright shaft, *i*, on the upper end of which there is a collar to sustain it.

On the lower end of the above-named shaft four arms, *i'*, extend out horizontally, the ends of which are bent down at right angles. In the ends of these arms are set-screws (horizontal) pointing toward the center. On the same shaft there is a pulley, $i^2$, from which a belt runs to a pulley on the main shaft, which runs loosely upon it. This last-named pulley has another connected with it which receives its motion from a belt, $i^3$, that connects it with a horizontal pulley, *k*, suspended in a frame, *k'*, between the uprights. This frame is retained in place by a crane, $k^2$, which is connected with shaft *f* by collars surrounding it. The frame *h* is sustained at any elevation on the shaft *f*, carrying the pulley and crane $k^2$ with it by means of a screw, *l*, that enters a nut near the shoulder of the arm *g* at the top of the shaft. This screw is connected with a rod, *l'*, by a pin passing through both, which rod extends down through the frame and is furnished with a crank on its lower end. The arm *g* is made to swivel round in the collars so that the screw can be turned over and its opposite end coupled with the rod *l'*, thus saving the time in running back the screw when the log is sawed up. The outer end of the arm passes through an eye in the upper end of a vertical rod, *g'*, which rod runs down through holes made in the horizontal pieces of the frame *h* to receive it to a short distance below the level of the saw. The shaft *f* passes through the lever *m* situated near its lower end and sustained on a collar which surrounds the shaft and is secured thereto by a set-screw. The end of the lever, which extends backward, is straight and is provided with a weight, *m'*, upon it. The forward end curves downward and forward, the extreme end being horizontal and extending nearly to the rod *g'*. About half way between the shaft *f* and rod *g'* a stud, $m^2$, is placed through the lever, on the upper end of which there is a catch. On the lower end and below the lever there is a short arm, $m^3$, affixed thereto, and by which it is turned, as hereinafter described. Below the lever just named there is another lever, *n*, formed like the forward end of the lever *m*, and extending out horizontally beyond it to a line with the center of shaft, and below it, at which point there is a spur or center pin, *n'*, on it. (Shown by dotted lines in the drawings.) The rod *g* passes through this lever when it is up to its place, and a stud, $n^2$, projects up between the rod and the end of lever *m*, on the top of which a trap-piece, $n^3$, is jointed. This piece is brought over the end of the lever *m* and caught under the catch on the stud $m^2$, which is turned round over it, the arm $m^3$ affixed to its lower end being jointed toward the frame.

When a block is placed into the machine to be sawed it is centered on the shaft $i$ and retained in position by the set-screws in the arm $i'$. The lower lever, $n$, is then brought up to its place and the trap fastened, so that the weight on lever $m$ will hold it while the block is being sawed. The block is slowly revolved by the pulleys and bands above described. The pulley $k$ (see Fig. 2) is turned by means of a band, $o'$, from a pulley, $o$, situated between the uprights, and which takes its motion from the prime mover. The band $o'$ pasess up from pulley $o$ over pulley $k$, thence down around a pulley, $k^3$, in the same frame, thence up over a pulley, $o^2$, situated near the top of the uprights, (which is counterbalanced by a weight,) from which pulley it descends to $o$. By this arrangement the pulleys $k$ $k^3$ revolve at any height the frame $k$ is raised.

When the machine is set in motion the block is drawn up to the saw by means of a weight, (not shown in the drawings,) from which a cord passes to the rod $g'$, with which it is connected by a hook, $w$. When the block is nearly sawed off the arm $m^3$ on the stud $m^2$ strikes a projection, $t$, from the upright, causing the stud to turn and release the lever $n$, that falls down just before the piece is entirely freed from the block, thus allowing it to fall when cut off. The screw $l$ is then turned till the block is brought low enough for another cut, and the lower lever, $n$, is again replaced as before without again centering the block. This operation is repeated until the entire piece is sawed up.

I claim—

Revolving a log or block while being sawed, in order that the pieces sawed off may be of uniform thickness on all sides, and the mechanism herein described, or its equivalent, for raising and lowering said block that it may be sawed into pieces of any desired thickness without being removed from the machine, said block being centered but once in sawing up the entire log, substantially as herein set forth.

CORNELIA WATERMAN,
*For Waterman and Russell.*

Witnesses:
I. C. DICKEY,
S. W. WOOD.